United States Patent [19]

Igarashi

[11] Patent Number: 5,110,848

[45] Date of Patent: May 5, 1992

[54] WET DISPERSION PROCESS AND PROCESS OF PRODUCING HEAT-SENSITIVE RECORDING MATERIAL

[75] Inventor: Akira Igarashi, Shizuoka, Japan

[73] Assignee: Fuji Photo Film Co., Ltd., Kanagawa, Japan

[21] Appl. No.: 304,453

[22] Filed: Feb. 1, 1989

[30] Foreign Application Priority Data

Feb. 1, 1988 [JP] Japan .................... 63-021812
Apr. 4, 1988 [JP] Japan .................... 63-082545

[51] Int. Cl.$^5$ .................... C08L 3/00; C08L 5/00; B41M 3/12; B41M 5/20
[52] U.S. Cl. .................... 524/30; 524/22; 524/25; 524/46; 524/47; 524/55; 524/732; 524/733; 524/734; 427/150; 427/151; 427/395; 525/327.8; 503/209; 503/217; 503/218; 503/221
[58] Field of Search .................... 524/22, 25, 30, 46, 524/47, 55, 730, 733, 734; 428/913; 503/209, 217, 221, 218; 430/338, 348, 346; 427/150, 151, 395; 525/327.8

[56] References Cited

U.S. PATENT DOCUMENTS

| | | | |
|---|---|---|---|
| 3,236,797 | 2/1966 | Williams | 525/327.8 |
| 3,859,112 | 1/1975 | Kohmura et al. | 430/338 |
| 3,936,309 | 2/1976 | Kohmura et al. | 503/209 |
| 4,321,309 | 3/1982 | Mino et al. | 430/348 |
| 4,411,979 | 10/1983 | Nagamoto et al. | 430/346 |
| 4,436,920 | 3/1984 | Sato et al. | 503/209 |
| 4,480,052 | 10/1984 | Ichijima et al. | 503/209 |
| 4,489,337 | 12/1984 | Watanabe et al. | 503/209 |
| 4,717,593 | 1/1988 | Igarashi et al. | 427/151 |

FOREIGN PATENT DOCUMENTS 2140449 11/1984 United Kingdom .

*Primary Examiner*—John Kight, III
*Assistant Examiner*—P. Hampton-Hightower

*Attorney, Agent, or Firm*—Sughrue, Mion, Zinn, Macpeak & Seas

[57] ABSTRACT

A process for dispersing particles of an organic commpound in water is disclosed, which comprises dispersing the organic compound in water using (1) a water-soluble high molecular weight compound having a molecular weight of at least 10,000 and (2) a copolymer formed from a monomer represented by the following formula (I) and a monomer represented by the following formula (II), said copolymer having a molecular weight of not more than 10,000:

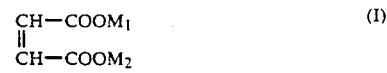

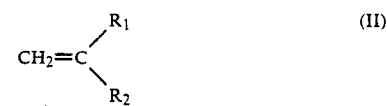

wherein $M_1$ and $M_2$ each represents an alkali metal atom or an ammonium group; $R_1$ represents a hydrogen atom, a methyl group, or an ethyl group; and $R_2$ represents an alkyl group having from 2 to 18 carbon atoms.

A process of producing a heat-sensitive recording material is also disclosed, which comprises the steps of:

(a) dispersing at least one of an electron-donating dye precursor and an electron-accepting compound in water using a water-soluble high molecular weight compound having a molecular weight of at least 1,000;

(b) adding a copolymer formed form a monomer represented by formula (II) shown above to the dispersion, said copolymer having a molecular weight of not more than 10,000; and then (c) heat-treating the dispersion at a temperature of from 30° C. to 90° C.

12 Claims, No Drawings

WET DISPERSION PROCESS AND PROCESS OF PRODUCING HEAT-SENSITIVE RECORDING MATERIAL

FIELD OF THE INVENTION

This invention relates to a process for dispersing organic compounds using water as a dispersion medium, and more particularly to a process for producing heat-sensitive recording materials having excellent storage stability of the colored product and giving less fog at the background portion.

BACKGROUND OF THE INVENTION

It is very important to be able to uniformly disperse an organic compound in water since the dispersion can be industrially handled as an aqueous solution. Practically, there are dispersions of latex polymers, waxes, etc., and various kinds of emulsions. In particular, recently, in the field of manufacture of information recording papers such as heat-sensitive recording papers, etc., it has been required to disperse organic compounds having a low melting point in water uniformly and in a fine particulate state. More particularly, in the case of heat-sensitive recording papers, it is an important technical point to uniformly disperse fine particles of organic compounds since the particle size of the dispersion influences important properties such as the sensitivity, etc., of the recording material, as described in British Patent 2,085,178. Thus, various attempts such as the use of a media mill have been provided as described in JP-A-58-69089 (the term "JP-A" as used herein refers to a "published unexamined Japanese patent application"). However, in this case, there is a problem that when the temperature of the dispersion system necessary for obtaining a dispersion of desired fine particles is greatly increased, a stable dispersion is not obtained.

This tendency becomes more severe as the melting point of an organic compound being dispersed is lowered.

On the other hand, a recording material using an electron-donating dye precursor (hereinafter referred to as a color former) and an electron-accepting compound (hereinafter referred to as a color developer) is well known as pressure-sensitive recording papers, heat-sensitive recording papers, light- and pressure-sensitive recording papers, and electro-heat-sensitive recording papers. These recording papers are described in detail, for example, in British Patent 2,140,449, U.S. Pat. No(s). 4,480,052 and 4,436,920, JP-B-60-23922 (the term "JP-B" as used herein refers to an "examined Japanese patent publication"), JP-A-57-179836, JP-A-60-123556 and JP-A- 60-123557.

A recording material is required to perform so that (1) the color density and the coloring sensitivity are sufficient, (2) fog is not formed, and (3) the storage stability of the colored product after coloring is sufficiently high. However, recording materials completely satisfying the aforesaid requirements have not yet been obtained.

In particular, recently, the range of applications using heat-sensitive recording materials has increased and in various applications of the recording papers, the fastness required for the colored product has increased even more. In such recording materials, the storage stability of colored products under high temperature and high humidity conditions is important.

For improving the aforesaid storage stability, it has been proposed to use a mixture of two or more color formers, as disclosed in JP-B-59-53193. However, when two or more kinds of color formers are used as a mixture thereof, the formation of fog at white portions or background portions increases and the formation of the fog is particularly increased under high temperature and high humidity conditions.

Also, for obtaining a sufficient coloring sensitivity, an attempt has been made to reduce the particle sizes of the color former(s) and color developer, whereby their surface areas thereof are enlarged to increase the reactivities. However, such an attempt also increases the formation of fog in the heat-sensitive recording materials.

For preventing the formation of fog, various attempts have been proposed. For example, an attempt involving protecting at least one of the color former and the color developer with a protective colloid (water-soluble polymer) having a high adsorptive power to restrain the occurrence of reaction between the color former and color developer in the coating composition containing them is disclosed in JP-B-51-29945, JP-A-56-55288, JP-A-55-28805, and JP-A-55-159992, an attempt involving restraining the occurrence of reaction between the color former and color developer in the coating composition by keeping the pH of the coating composition at an alkaline state is disclosed in JP-B-51-28235 and JP-B-55-6077, an attempt involving using a neutral paper as the support for the heat-sensitive recording paper is disclosed in JP-A-55-14281, an attempt involving adding an antifoggant to the coating composition for the heat-sensitive layer is disclosed in JP-B-49-3943 and JP-A-48-101943, and also an attempt involving heat-treating the fine dispersion of the aforesaid two components is disclosed in JP-A-54-98253.

However, many of these attempts are accompanied by the disadvantages that the effects are insufficient, they raise the manufacturing cost, and/or the steps become complicated, and hence these attempts are not always satisfactory for practical purposes.

SUMMARY OF THE INVENTION

A first object of this invention is to provide a process of uniformly and finely dispersing an organic compound in an aqueous dispersion medium.

A second object of this invention is to provide a process of producing a heat-sensitive recording material having an excellent coloring property, giving a colored product having good storage stability, and giving less fog.

It has now been discovered that the aforesaid first object can be attained by the first embodiment of this invention as shown below.

That is, according to the first embodiment of this invention, there is provided a process for dispersing particles of an organic compound in water, which comprises dispersing the organic compound in water using (1) a water-soluble high molecular weight compound having a weight average molecular weight of at least 10,000, and (2) a copolymer formed from a monomer represented by formula (I) and a monomer represented by formula (II), said copolymer having a weight average molecular weight of not more than 10,000;

(II)

wherein $M_1$ and $M_2$ each represents an alkali metal atom or an ammonium group; $R_1$ represents a hydrogen atom, a methyl group, or an ethyl group; and $R_2$ represents an alkyl group having from 2 to 18 carbon atoms.

It has also been discovered that the aforesaid second object can be attained by the second embodiment of this invention as shown below.

That is, according to the second embodiment for this invention, there is provided a process of producing a heat-sensitive recording material comprising a support having provided thereon a heat-sensitive color-forming layer containing finely dispersed particles of an electron-donating dye precursor (a color former) and finely dispersed particles of an electron-accepting compound (a color developer), which comprises the steps of: (a) dispersing at least one of the electron-donating dye precursor and the electron-accepting compound in water using a water-soluble high molecular weight compound having a weight average molecular weight of at least 10,000; (b) adding a copolymer formed from the monomer of formula (I) shown above and the monomer of formula (II) shown above to the dispersion, the copolymer having a weight average molecular weight of not more than 10,000; and then (c) heat-treating the dispersion at a temperature of from 30° C. to 90° C.

DETAILED DESCRIPTION OF THE INVENTION

Then, the first and second embodiments of this invention are explained in detail.

The water-soluble high molecular weight compound having a weight average molecular weight of at least 10,000 for use in this invention preferably has a water solubility of at least 5% by weight at 25° C. and practical examples thereof are polyvinyl alcohol, methyl cellulose, carboxymethyl cellulose, starches (including modified starch), gelatin, gum arabic, casein, a hydrolyzed product of a styrene-maleic anhydride copolymer, carboxy-modified polyvinyl alcohol, polyacrylamide, and a saponification product of a vinyl acetate-polyacrylic acid copolymer. The preferred molecular weight of the water-soluble high molecular weight compound is from 10,000 to 100,000.

Also, as the copolymer formed from the monomer of the above formula (I) and the monomer of the above formula (II), having a weight average molecular weight of not more than 10,000 for use in this invention, there are sodium salts, potassium salts, ammonium salts, etc., of a copolymer of maleic acid and 1-methyl-1-(2,2-dimethylpropyl)ethylene, a copolymer of maleic acid and 1-methyl-1-(3-methylbutyl)ethylene, a copolymer of maleic acid and 1-(2,2-dimethylpropyl)ethylene, a copolymer of maleic acid and 1-methyl-1-octylethylene, etc. The preferred molecular weight of the copolymer is from 2,000 to 10,000.

The addition amounts of these dispersing aids are as follows.

The addition amount of the water-soluble high molecular weight compound as the dispersing aid is preferably from 1% by weight to 25% by weight, and more preferably from 2% by weight to 15% by weight, based on the amount of organic compound(s) being dispersed. If the content of the dispersing aid is less than 1% by weight, the stability of the dispersion formed is inferior and if the content is higher than 25% by weight, the viscosity of the dispersion is increased to reduce the dispersion efficiency.

Also, the addition amount of the above-described copolymer as the dispersing aid is preferably from 0.1% by weight to 5% by weight, and more preferably from 0.2% by weight to 2% by weight, based on the amount of the organic compound(s). If the content is less than 0.1% by weight, the effect is low and even if the dispersing aid is added over 5% by weight, no further improvement of the effect is obtained.

The ratio of monomer of formula (I)/monomer of formula (II) is preferably from 1/1 to 3/7. More preferably the ratio is 1/1.

The effect of this invention is particularly remarkable when organic compound(s) having a melting point of 250° C. or lower, more particularly 200° C. or lower are dispersed in water using the above-described dispersing aids. Practical examples of such an organic compound are color formers, sensitizers, waxes, and other organic additives which are generally used for heat-sensitive recording materials. Specific examples of these organic compounds are described in JP-A-55-227253, JP-A-59-95190, JP-A-57-34995, JP-A-57-125092, and JP-A-59-190886.

In this invention, the dispersion may be performed using a high shearing type dispersing machine such as a homogenizer, a Kady mill, a dissolver, etc., or a media mill such as a ball mill, an attritor, a sand mill, etc., and the effect of this invention is more remarkable in the case of dispersing a dispersion having a high solid concentration of over 30% using a dispersing machine such as media mill.

That is, it is assumed that when a dispersion of high concentration as described above is finely dispersed using a media mill, the liquid temperature is greatly increased by the shearing of the media particles themselves and shearing between media and the dispersoid to locally melt the surfaces of the organic compound particles. Thus, in a case, a sufficient dispersing effect is not obtained by a conventional inorganic dispersing agent such as hexametaphosphate, sodium pyrophosphate, etc., or a conventional organic dispersing agent such as polyacrylic acid, etc. On the other hand, in this invention, the copolymer utilized as the dispersing aid shows a stable adsorptive faculty at high temperature and stabilizes organic compound(s) which are dispersed. Furthermore, water-soluble high molecular weight compound for use this invention as the other dispersing aid enhances effect as a protective colloid.

Then, the second embodiment of this invention is explained in detail.

According to the process of this invention, the formation of fog in the heat-sensitive recording material obtained can be greatly reduced without reducing the coloring property and the storage stability of the colored product. The process of this invention has the advantages that the improvement of the whiteness (reduction of the formation of fog) of the heat-sensitive recording material produced is remarkable as compared to a conventionally known process of simply heat-treating a dispersion of the components for a heat-sensitive layer as well as preventing occurrence of the troubles such as reaggregation of dispersed particles at the heat treatment, and further, gelation of the dispersion is remarkably reduced. The effects of this invention are more remarkable when the mean particle size of the dispersed color former and/or color developer is not larger than 2 μm. The effects of this invention are explained in detail by practically illustrating the production process.

In an embodiment of the production process of this invention, a color former and/or a color developer is finely dispersed in water and in this case, a water-soluble high molecular weight compound, a surface active agent, etc., are used as dispersing aids. In this case, the water-soluble high molecular weight compound having a molecular weight of at least 10,000 described above is used. Also, the copolymer formed from the monomer shown by formula (I) and the monomer shown by formula (II) may be used for dispersing the aforesaid components.

The dispersion can be performed by utilizing a dispersing means such as a ball mill, a pebble mill, a sand mill, an attritor, a three roller mill, etc. The mean particle size of the dispersed components is preferably as small as possible but is usually not larger than 5 μm, and preferably not larger than 2 μm as volume mean particle size in consideration of the dispersing time.

The concentration of solid components in the dispersion is generally from 10% to 50% (w/w).

The dispersion of the color former and/or the color developer is subjected to heat treatment in the presence of the copolymer of the monomer shown by formula (I) and the monomer shown by formula (II) in this invention for inhibiting the formation of fog. It is necessary that the copolymer for use in this invention is added to the dispersion before the application of heat treatment. If the dispersion does not contain the copolymer according to this invention, the dispersion is very liable to cause aggregation. The amount of the copolymer is preferably from 0.1% to 5% (w/w), and more preferably from 0.5% to 3% (w/w), based on the weight of the color former and/or the color developer. If the content thereof is less than 0.1%, the aforesaid effect is not obtained and if the content is more than 5%, further improvement of the effect is not obtained.

In a preferred embodiment of the copolymer compound for use in the second embodiment of this invention, $M_1$ and $M_2$ in formula (I) are sodium or potassium and in formula (II), $R_1$ is a methyl group and $R_2$ is a tert-pentyl group, a sec-pentyl group, a tert-butyl group, a sec-butyl group, or a propyl group.

The heat treatment can be performed by placing the dispersion in a tank equipped with a jacket followed by increasing the temperature with stirring, or increasing the temperature of the dispersion by heat change using a countercurrent heat exchange double pipe, or further increasing the temperature of the dispersion using a temperature-increasing means such as infrared rays, etc.

The heat treatment temperature is from 30° C. to 90° C., and preferably from 40° C. to 80° C. If the heat treatment temperature is lower than 30° C., the effect of inhibiting the formation of fog is insufficient and if the temperature is higher than 90° C., it becomes difficult to prevent the occurrence of troubles by the evaporation of water The preferred heat treatment time depends upon heat treatment temperature but may be from 15 seconds to 1 hour. An increase in the heat treatment temperature of 10° C. reduces the heat treatment time by almost ½.

The heat-treated dispersion is then cooled to a temperature below 30° C. and is mixed with other dispersions. When a color former and a color developer separately dispersed in water, each of the may be heat-treated as described above and after cooling, the dispersion may be mixed with each other. In this case, if necessary, a binder, an oil absorptive pigment, a wax dispersion, a lubricant, a water resistance increasing agent, etc., may be added.

Also, for improving the coloring sensitivity, sensitizer(s) can be used and in this case the sensitizer(s) may be dispersed separately in water and the dispersion may be mixed with the aforesaid dispersion color former and/or the color developer, or the sensitizer(s) may be simultaneously dispersed with a former and/or a color developer. In the latter case, the preferred amount of the copolymer for use in invention is based on the combined amount of the color former or the color developer and the sensitizer(s).

As the color former for use in this invention, there are triarylmethane series compounds, diphenylmethane series compounds, xanthene series compounds, thiazine series compounds, spiropyran series compounds, etc. Typical examples thereof are described, for example, in JP-A-55-227253. Specific examples thereof are triarylmethane series compounds such as 3,3-bis(p-dimethylaminophenyl)-6-dimethylaminophthalide, 3,3-bis(p-dimethylaminophenyl)phthalide, 3-(p-dimethylaminophenyl)-3-(1,3-dimethylindol-3-yl)phthalide, 3-(p-dimethylamino-phenyl-3-(2-methylindol-3-yl)phthalide, etc.; diphenyl-methane series compounds such as 4,4'-bis-dimethylaminobenzhydrin-benzyl ether, N-halophenyl-leucoauramine, N-2,4,5-trichlorophenylleucoauramine, etc.; xanthene series compounds such as rhodamine-B-anilinolactam, rhodamine(p-nitrilo)lactam, rhodamine(p-nitrilo)lactam, 2-(dibenzylaminofluoran, 2-anilino-3- methyl-6-diethylaminofluoran, 2-anilino-3-methyl-6dibutylaminofluoran, 2-anilino-3-methyl-6-N-ethyl-N-isoamylaminofluoran, 2-anilino-3-methyl-6-N-methyl-N-cyclohexylaminofluoran, 2-anilino-3-chloro-6-diethylaminofluoran, 2-anilino-3-methyl-6-N-ethyl-N-isobutylaminofluoran, 2-anilino-6-dibutylaminofluoran, 2-anilino-3-methyl-6-N-methyl-N-tetrahydrofluorofurylaminofluoran, 2-anilino-3-methyl-6-piperidinoaminofluoran, 2-(o-chloro-anilino)-6-diethylamnofluoran, 2-(3,4-dichloroanilino)-6-diethylaminofluoran, etc.; thiazine series compounds such as benzoylleucomethylene blue, p-nitrobenzyl-leucomethylene blue, etc.; and spiropyran series compounds such as 3-methyl-spiro-dinaphthopyran, 3-ethyl-spiro-dinaphthopyran, 3,3'-dichlorospiro-dinaphthopyran, 3-benzylspiro-dinaphthopyran, 3-methyl-naphtho-(3-methoxybenzo)-spiropyran, 3-propyl-spiro-dibenzopyran, etc.

As the color developer for use in this invention, phenolic compounds, salicylic acid derivatives nd the polyvalent metal salts thereof are preferably used. Specific examples thereof are phenolic compound such as 2,2'-bis(4-hydroxyphenyl)propane, 4-t-butylphenol, 4-phenylphenol, 4-hydroxydiphenoxide, 1,1'-bis(3-chloro-4hydroxyphenyl)cyclohexane, 1,1'-bis(4-hydroxyphenyl)cyclohexane, 1,1'-bis(3-chloro-4-hydroxyphenyl)-2-ethyl-butane, 4,4'-sec-isooctylidenediphenol, 4,4'-secbutylidenediphenol, 4-tert-octylphenol, 4-p-methylphenyl-phenol, 4,4'-methylcyclohexylidenephenol, 4,4'isopentylidenephenol, benzyl p-hydroxybenzoate, etc., salicylic acid derivatives such as 4-pentadecylsalicylic acid, 3,5-di(-methylbenzyl)salicylic acid, 3,5-di(tert-octyl)salicylic acid, 5-octadecylsalicylic acid, 5-α-methylbenzylphenyl)ethylsalicylic acid, 3-α-methyl- benzyl-5-tert-octylsalicylic acid, 5-tetradecylsalicylic acid, 4-hexyloxysalicylic acid, 4-cyclohexyloxysalicylic acid, 4-decyloxysalicylic acid, 4-dodecyloxysalicylic acid, 4-pentadecyloxysalicylic acid, 4-octadecyloxysalicylic acid, etc., and the zinc salts, aluminum salts, calcium salts, copper salts, and lead salts of these acids.

The color developer is used in an amount of preferably from 50 to 800% by weight, and more preferably from 100 to 500% by weight, of the amount of the aforesaid color former. If the content thereof is less than 50% by weight, the color formed is insufficient and even if the content is increased over 800% by weight, the further increase of the effect is not obtained and thus the use of such a large amount is undesirable.

The recording material of the present invention may contain various additives in the heat-sensitive color-forming layer for meeting various requirements. Specific examples of the various additives include a heat-fusible substance, a binder, a pigment, a lubricant, wax, a surface active agent, a color fading inhibitor, etc.

In this invention, a heat-fusible substance is preferably used for the heat-sensitive color-forming layer and examples thereof are benzyl p-benzyloxybenzoate, β-naphthylbenzyl ether, stearic acid amide, stearylurea, p-benzylbiphenyl, di(2-methy-phenoxy)ethane, di(2-methoxyphenoxy)ethane, β-naphthol(p-methylbenzyl)-ether, α-naphthylbenzyl ether, 1,4-butanediol-p-methylphenyl ether, 1,4-butanediol-p-isopropylphenyl ether, 1,4-butanediol-p-tert-octylphenyl ether, 1-phenoxy-2-(4-ethylphenoxy)ethane, 1-phenoxy-2-(4-chlorophenoxy)ethane, 1,4-butanediol phenyl ether, diethylene glycol-bis(4-methoxyphenyl) ether, etc.

The aforesaid heat-fusible substances may be used singly or as a mixture thereof. For obtaining a sufficient heat response, the heat-fusible substance is used in an amount of preferably from 10 to 200% by weight, and more preferably from 20 to 150% by weight, based on the amount of the color developer.

In this invention, the water-soluble high molecular weight compound which is used at dispersion can be used as it is as a binder for the heat-sensitive color-forming layer but a latex series binder of a synthetic polymer such as a styrene-butadiene copolymer, a vinyl acetate copolymer, an acrylonitrile-butadiene copolymer, a methyl acrylate-butadiene copolymer, polyvinylidene chloride, etc., can be further used as a binder.

As a pigment which can be used in this invention for the heat-sensitive color-forming layer, there are calcium carbonate, barium sulfate, lithopone, agalmatolite, caolin, silica, noncrystal silica, etc.

As a lubricant for use in this invention, metal salts of higher aliphatic acids may be used and specific examples thereof are zinc stearate, calcium stearate, aluminum stearate, etc.

Also, as wax for use in this invention, there are paraffin wax, microcrystalline wax, carnauba wax, methylolstearoamide, polyethylene wax, polystyrene wax, aliphatic amide series waxes, etc., they can be used singly or as a mixture thereof.

As the surface active agent for use in this invention, there are alkali metal salts of sulfosuccinic acid and fluorine-containing surface active agents.

Also, it is preferred to add a color fading inhibitor into the heat-sensitive color-forming layer for inhibiting fading of image printed portions and fastening the images formed. As the color fading inhibitors, there are phenol compounds, in particular, hindered phenol compounds. Specific examples thereof are 1,1,3-tris(2-methyl-4-hydroxy-tert-butylphenyl)butane, 1,1,3-tris(2-ethyl-4-hydroxy-5-tert-butylphenyl)butane, 1,1,3-tris-(3,5-di-tert-butyl-4-hydroxhenyl)butane, 1,1,3-tris(2-methyl-4-hydroxy-5-tert-butylphenyl)propane, 2,2,'-methylenebis(6-tert-butyl-4-methylphenol), 2,2,'-methylenebis(6-tert-butyl-4-ethylphenol), 4,4'butylidenebis(6-tert-butyl-3-methylphenol) and 4,4'-thiobis(3-methyl-6-tert-butylphenol).

The addition amount of the phenolic compound is preferably from 1 to 200% by weight, and more preferably from 5 to 50% by weight, based on the amount of the color developer.

After mixing these components, the mixture is coated on a support. As the support, papers, synthetic papers, various film bases, etc., are used and in this case, a subbing layer can previously be formed on the support for obtaining high smoothness.

The heat-sensitive recording material thus formed is dried and subjected to calender treatment before use.

Then, the present invention is further explained practically by the following examples but the present invention is not limited to them.

EXAMPLES 1 TO 3

As organic compounds being dispersed, (A) β-naphthylbenzyl ether (m.p. 101° C., a sensitizer for heat-sensitive recording paper), (B) 2-anilino-3-methyl-6-isoamylethylaminofluoran (m.p. 164° C., a color former for heat-sensitive recording paper), and (C) bis(2-hydroxy-3-tert-butyl-5-methylphenyl)methane (m.p. 128° C., an additive for rubber) were selected and 50 g of each of the organic compounds (A) to (C) was added to an aqueous solution of 5% polyvinyl alcohol (weight average molecular weight 22,000, saponification degree 98%) for Examples 1, 2 and 3, respectively. Then, after further adding 0.5 g of the sodium salt of a maleic acid/1-methyl-1-(2,2dimethylpropyl)ethylene copolymer (weight average molecular weight 6,000) to each of the mixtures containing the aforesaid organic compounds, the mixtures were dispersed using a sand grinder, Dynomill KDL (trade name, manufactured by WAB Company in West Germany) until the mean particle size became 1 μm. The state and the viscosity of the dispersion are shown in Table 1 below. High viscosity causes the reduction of the dispersion efficiency and thus is undesirable.

COMPARATIVE EXAMPLES 1 TO 3

The same procedures as in the above examples were followed without using the copolymer employed in this invention.

COMPARATIVE EXAMPLES 4 AND 5

The same procedures as in Examples 1 and 3 were followed without using the polyvinyl alcohol of the water-soluble high molecular weight compound in this invention.

COMPARATIVE EXAMPLES 6 AND 7

The same procedure as in Example 2 was followed while using each of the dispersing aids shown in Table 2 below in place of the copolymer in this invention.

COMPARATIVE EXAMPLE 8

The same procedure as in Example 1 was followed using no dispersing aids.

The results of Comparative Examples 1 to 8 are shown in Table 2 below.

As is clear from the results of Tables 1 and 2, Examples 1 to 3 according to the present invention exhibit good dispersion state as compared to Comparative Examples. Further, Comparative Examples 2, 3, 6 and 8 cannot measure the viscosity of dispersion because of the occurrence of aggregation. Examples 1 to 3 provide the low viscosity as compared to Comparative Examples 1, 4, 5 and 7.

TABLE 1

| Example No. | Dispersoid | Dispersing Aid | Dispersion State | Viscosity*1 |
|---|---|---|---|---|
| 1 | (A) | Polyvinyl alcohol, and sodium salt of maleic acid/1-methyl-1-(2,2-dimethylpropyl) ethylene copolymer | Good | 36 c.p. |
| 2 | (B) | Polyvinyl alcohol, and sodium salt of maleic acid/1-methyl-1-(2,2-dimethylpropyl) ethylene copolymer | Good | 42 c.p. |
| 3 | (C) | Polyvinyl alcohol, and sodium salt of maleic acid/1-methyl-1-(2,2-dimethylpropyl) ethylene copolymer | Good | 45 c.p. |

*1Viscosity of dispersion measured by B-type viscometer at 25° C.

TABLE 2

| Comparative Example No. | Dispersoid | Dispersing Aid | Dispersion State | Viscosity*1 |
|---|---|---|---|---|
| 1 | (A) | Polyvinyl alcohol | Fairly inferior | 67 c.p. |
| 2 | (B) | " | Inferior*2 | — |
| 3 | (C) | " | Inferior*2 | — |
| 4 | (A) | Sodium salt of maleic acid/1-methyl-1-(2,2-dimethylpropyl)-ethylene copolymer | Good | 50 c.p. |
| 5 | (C) | Sodium salt of maleic acid/1-methyl-1-(2,2-dimethylpropyl)-ethylene copolymer | Fairly inferior | 80 c.p. |
| 6 | (B) | Polyvinyl alcohol and sodium hexametaphosphate | Inferior*2 | — |
| 7 | (B) | Polyvinyl alcohol and sodium polyacrylate (weight average molecular weight: 8,000) | Fairly inferior | 76 c.p. |
| 8 | (A) | None | Inferior*2 | — |

*2"Inferior" means the occurrence of aggregation before the mean particle size reaches 1 μm.

EXAMPLE 4

To 20 parts by weight of an aqueous solution of 5% polyvinyl alcohol (Kuraray PVA-105, trade name, made by Kuraray Co., Ltd., weight average molecular weight: 22,000) was added 10 parts by weight of 2-anilino-3-methyl-6-diethylaminofluoran as a color former and the mixture was dispersed using a sand mill (Dynomill Type KDL-P, made by WAB Company in West Germany) at a medium packing amount of 80% and treatment amount of 0.5 liter/min. The dispersion step was carried out several times for finely dispersing.

Also, a color developer, 2,2-bis(4-hydroxyphenyl)-propane was dispersed by the same manner as above.

After dispersion, a copolymer of sodium maleate and 1-tert-pentyl-1-methylethylene (average molecular weight 3,000) was added to each dispersion in an amount of 1% by solid component weight ratio of the color former or the color developer. Each dispersion was heated to 50° C. and after keeping the dispersion at the temperature for 30 minutes, the dispersion was cooled to 25° C.

After cooling, one part by weight of the dispersion of the color former was mixed with 2 parts by weight of the dispersion of the developer and further 2 parts by weight of a dispersion of 50% calcium carbonate, 0.5 part by weight of a dispersion of 30% zinc stearate, and 0.5 part by weight of a dispersion of 30% paraffin wax were added to the mixture to provide a coating composition for heat-sensitive color-forming (recording) layer.

The coating composition was coated on a wood free paper (basis weight of 50 g/m$^2$) at a solid component coverage of 6.0 g/m$^2$ dried at 50° C., and subjected to a supercalender treatment to provide a heat-sensitive recording paper.

The heat-sensitive recording paper thus obtained was printed on using a printing test machine made by Kyocera Corporation at 0.35 w/dot, a printing density of 8 dot×7.7 dot/mm$^2$, a pulse width of 1 ms, and a pulse period of 10 ms and then the density was measured by a densitometer Type RD-918 (Wratten #106 filter) made by Macbeth Co. In this case, the density of the background portion of the heat-sensitive recording paper before printing was measured as "fog". The fog value of 0.20 or more may bring about a practical disadvantage.

Also, the particle sizes of the color former and the color developer thus dispersed were measured by Microtruck Type SPA, made by L & N Co., in U.S.A.

The results thus obtained are shown in Table 3 below.

EXAMPLES 5 TO 11

The same procedure as in Example 4 was followed except that each of the color formers shown in Table 3 below was used in place of the color former in Example 4.

The results obtained are shown in Table 3.

EXAMPLES 12 AND 13

The same procedure as in Example 4 was followed except that each of the color developers shown in Table 3 was used in place of the color developer in Example 4.

The results obtained are shown in Table 3.

EXAMPLES 14 TO 19

The same procedure as in Example 4 was followed except that the heat treatment time and temperature were changes as shown in Table 4.

The results obtained are shown in Table 4.

EXAMPLES 20 TO 23

The same procedure as in Example 4 was followed except that the copolymer in this invention was changed as shown in Table 5.

The results obtained are shown in Table 5.

COMPARATIVE EXAMPLE 9

The same procedure as in Example 4 was followed except that the copolymer in this invention was not used.

The results obtained are shown in Table 3.

COMPARATIVE EXAMPLES 10 TO 15

The same procedures as in Examples 14 to 19 were followed except that the copolymer in this invention were not used.

The results obtained are shown in Table 4.

COMPARATIVE EXAMPLE 16

The same procedure as in Example 4 was followed except that the heat treatment was not performed.

The results obtained are shown in Table 3.

TABLE 3

| Example No. | Color Former | Color Developer |
|---|---|---|
| Example 4 | 2-Anilino-3-methyl-6-diethylaminofluoran | 2,2-Bis(4-hydroxyphenyl)-propane |
| Example 5 | 2-Anilino-3-chloro-6-diethylaminofluoran | 2,2-Bis(4-hydroxyphenyl)-propane |
| Example 6 | 2-Anilino-3-methyl-6-piperidinofluoran | 2,2-Bis(4-hydroxyphenyl)-propane |
| Example 7 | 2-Anilino-3-methyl-6-N-isoamyl-N-ethyl-aminofluoran | 2,2-Bis(4-hydroxyphenyl)-propane |
| Example 8 | 2-Anilino-3-methyl-6-N-isoamyl-N-ethyl-aminofluoran | 2,2-Bis(4-hydroxyphenyl)-propane |
| Example 9 | 2-Anilino-3-methyl-6-dibutylaminofluoran | 2,2-Bis(4-hydroxyphenyl)-propane |
| Example 10 | Mixture (1:1) of 2-anilino-3-chloro-6-diethylaminofluoran and 2-anilino-3-methyl-6-piperidinofluoran | 2,2-Bis(4-hydroxyphenyl)-propane |
| Example 11 | Mixture (1:1) of 2-anilino-3-chloro-6-diethylaminofluoran and 2-anilino-3-methyl-6-N-isoamyl-N-ethylaminofluoran | 2,2-Bis(4-hydroxyphenyl)-propane |
| Example 12 | 2-Anilino-3-methyl-6-diethylaminofluoran | Benzyl 4-hydroxybenzoate |
| Example 13 | " | 2,2'-Bis(4-hydroxyphenyl-thio)diethyl ether |
| Comparative Example 9 | " | 2,2'-Bis(4-hydroxyphenyl)-propane |
| Comparative Example 10 | " | 2,2'-Bis(4-hydroxyphenyl)-propane |

| Example No. | Copolymer | Heat Treatment | Print Density | Fog | Dispersed Particle Size Color Former | Dispersed Particle Size Color Developer |
|---|---|---|---|---|---|---|
| Example 4 | Applied | Applied | 0.75 | 0.06 | 0.92 | 1.68 |
| Example 5 | " | " | 0.76 | 0.06 | 0.88 | " |
| Example 6 | " | " | 0.74 | 0.07 | 0.86 | " |
| Example 7 | " | " | 0.84 | 0.07 | 0.95 | " |
| Example 8 | " | " | 0.68 | 0.05 | 2.2 | " |
| Example 9 | " | " | 0.73 | 0.08 | 0.81 | " |
| Example 10 | " | " | 0.80 | 0.07 | 0.91 | " |
| Example 11 | " | " | 0.88 | 0.07 | 0.93 | " |
| Example 12 | " | " | 1.31 | 0.07 | 0.92 | 1.32 |
| Example 13 | " | " | 1.18 | 0.08 | 0.92 | 1.35 |
| Comparative Example 9 | None | " | Aggregated | — | 0.92 | 1.68 |
| Comparative Example 10 | Applied | None | 0.77 | 0.29 | 0.92 | 1.68 |

TABLE 4

| Example No. | Heat-Treatment Temperature (°C.) | Heat Treatment Time (min) | Print Density | Fog |
|---|---|---|---|---|
| Example 4 | 50 | 30 | 0.75 | 0.06 |
| Example 14 | " | 15 | 0.74 | 0.06 |
| Example 15 | " | 5 | 0.78 | 0.09 |
| Example 16 | 60 | 15 | 0.72 | 0.05 |
| Example 17 | " | 5 | 0.74 | 0.09 |
| Example 18 | 35 | 30 | 0.75 | 0.10 |
| Example 19 | " | 15 | 0.78 | 0.12 |
| Comparative Example 10 | 50 | 15 | Aggregated | — |
| Comparative Example 11 | " | 5 | " | — |
| Comparative Example 12 | 60 | 15 | " | — |
| Comparative Example 13 | " | 5 | " | — |
| Comparative Example 14 | 35 | 30 | " | — |
| Comparative Example 15 | " | 15 | 0.72 | 0.16 |
| Comparative Example 16 | — | 0 | 0.77 | 0.29 |

TABLE 5

| Example No. | High Molecular Weight Compound | Print Density | Fog |
|---|---|---|---|
| Example 4 | Sodium maleate/1-tert-pentyl-1-methylethylene copolymer (Mw = 3,000) | 0.75 | 0.06 |
| Example 20 | Sodium maleate/1-tert-pentyl-1-methylethylene copolymer (Mw = 1,200) | 0.77 | 0.08 |
| Example 21 | Sodium maleate/1-tert-pentyl-1-methylethylene copolymer (Mw = 10,000) | 0.73 | 0.05 |
| Example 22 | Sodium maleate/1-propyl-1-methylethane copolymer | 0.78 | 0.10 |

TABLE 5-continued

| Example No. | High Molecular Weight Compound | Print Density | Fog |
|---|---|---|---|
| Example 23 | (Mw = 3,200) Sodium maleate/1-hexyl-1-methylethylene copolymer (Mw = 8,000) | 0.72 | 0.09 |

As is clear from the results of Tables 3 to 5, Examples according to the present invention show less fog values without the occurrence of aggregation, as compared to Comparative Examples.

While the invention has been described in detail and with reference to specific embodiments thereof, it will be apparent to one skilled in the art that various changes and modifications can be made therein without departing from the spirit and scope thereof.

What is claimed is:

1. A process for dispersing particles of an organic compound in water, which comprises dispersing the organic compound in water using (1) a water-soluble high molecular weight compound having a molecular weight of at least 10,000 and (2) a copolymer formed from a monomer represented by the following formula (I) and a monomer represented by the following formula (ii), said copolymer having a molecular weight of not more than 10,000:

$$\begin{array}{l} CH-COOM_1 \\ \| \\ CH-COOM_2 \end{array} \quad (I)$$

$$CH_2=C\begin{array}{l} R_1 \\ \diagdown \\ R_2 \end{array} \quad (II)$$

wherein $M_1$ and $M_2$ each represents an alkali metal atom or an ammonium group; $R_1$ represents a methyl group; and $R_2$ represents an alkyl group having from 3 to 5 carbon atoms.

2. A process as in claim 1, wherein said copolymer has a weight average molecular weight of from 2,000 to 10,000.

3. A process as in claim 1, wherein said water-soluble high molecular weight compound has a water solubility of at least 5% by weight at 25° C.

4. A process as in claim 1, wherein said water-soluble high molecular weight compound is selected from the group consisting of polyvinyl alcohol, methyl cellulose, carboxymethyl cellulose, starches, modified starches, gelatin, gum arabic, casein, a hydrolyzed product of a styrene-maleic anhydride copolymer, carboxy-modified polyvinyl alcohol, polyacrylamide, and a saponification product of a vinyl acetate-polyacrylic acid copolymer.

5. A process as in claim 1, wherein the addition amount of the water-soluble high molecular weight compound is from 1% by weight to 25% by weight based on the weight of the organic compound.

6. A process as in claim 1, wherein the addition amount of the water-soluble high molecular weight compound is from 2% by weight to 15% by weight based on the weight of the organic compound.

7. A process as in claim 1, wherein the addition amount of the copolymer is from 0.1% by weight to 5% by weight based on the weight of the organic compound.

8. A process for producing a heat-sensitive recording material comprising a support having provided thereon a heat-sensitive color-forming layer containing finely dispersed particles of an electron-donating dye precursor and finely dispersed particles of an electron-accepting compound, which comprises the steps of:

(a) dispersing at least one of the electron-donating precursor and the electron-accepting compound in water using a water-soluble high molecular weight compound having a molecular weight of at least 10,000;

(b) adding a copolymer formed from a monomer represented by formula (I) and a monomer represented by formula (II) to the dispersion, said copolymer having a molecular weight of not more than 10,000:

$$\begin{array}{l} CH-COOM_1 \\ \| \\ CH-COOM_2 \end{array} \quad (I)$$

$$CH_2=C\begin{array}{l} R_1 \\ \diagdown \\ R_2 \end{array} \quad (II)$$

wherein $M_1$ and $M_2$ each represents an alkali metal atom or an ammonium group; $R_1$ represents a methyl group; and $R_2$ represents an alkyl group having from 3 to 5 carbon atoms; and then (c) heat-treating the dispersion at a temperature of from 30° to 90° C.

9. A process as in claim 8, wherein heat treatment is carried out at a temperature of from 40° C. to 80° C.

10. A process as in claim 8, wherein said water-soluble high molecular weight compound is selected from the group consisting of polyvinyl alcohol, methyl cellulose, carboxymethyl cellulose, starches, modified starches, gelatin, gum arabic, casein, the hydrolyzed product of a styrene-maleic anhydride copolymer, carboxy-modified polyvinyl alcohol, polyacrylamide, and the saponification product of a vinyl acetate-polyacrylic acid copolymer.

11. A process as in claim 8, wherein $R_2$ is selected from the group consisting of tert-pentyl group, a sec-pentyl group, a sec-butyl group, and a propyl group.

12. A process as in claim 1, wherein $R_2$ is selected from the group consisting of a tert-pentyl group, sec-pentyl group, a sec-butyl group, and a propyl group.

* * * * *